(12) United States Patent
Chari

(10) Patent No.: US 7,965,787 B2
(45) Date of Patent: Jun. 21, 2011

(54) RECEIVING WIRELESS SIGNALS WITH MULTIPLE DIVERSITY SETTINGS

(75) Inventor: Sujai Chari, San Franciso, CA (US)

(73) Assignee: NDSSI Holdings, LLC, San Jose, CA (US)

( * ) Notice: Subject to any disclaimer, the term of this patent is extended or adjusted under 35 U.S.C. 154(b) by 581 days.

(21) Appl. No.: 12/217,974

(22) Filed: Jul. 10, 2008

(65) Prior Publication Data

US 2010/0008400 A1   Jan. 14, 2010

(51) Int. Cl.
 *H04B 7/02*   (2006.01)
 *H04L 1/02*   (2006.01)
(52) U.S. Cl. ........ 375/267; 375/347; 375/346; 375/227; 375/132; 375/260; 455/500; 455/101
(58) Field of Classification Search ................... 375/267, 375/347, 346, 227, 260, 132, 224; 455/500, 455/101
See application file for complete search history.

(56) References Cited

U.S. PATENT DOCUMENTS

| | | |
|---|---|---|
| 2002/0006159 A1 * | 1/2002 | Wagner et al. ................ 375/224 |
| 2006/0067442 A1 * | 3/2006 | Tanaka ........................ 375/347 |
| 2006/0098570 A1 | 5/2006 | Hadad |
| 2006/0105709 A1 | 5/2006 | Oh et al. |
| 2006/0188003 A1 | 8/2006 | Larsson et al. |
| 2007/0211641 A1 | 9/2007 | Fu et al. |
| 2009/0135792 A1 * | 5/2009 | Gonikberg ................... 370/338 |

* cited by examiner

*Primary Examiner* — Phuong Phu
(74) *Attorney, Agent, or Firm* — Brian R. Short

(57) ABSTRACT

Methods and systems of receiving wireless signals are disclosed. One method includes a receiver characterizing signal quality parameters of receive signals for a plurality of receive diversity settings. The receiver selects a first receive diversity setting for synchronizing the receiver with the receive signal based on the characterized signal quality parameters. The receiver selects a second receive diversity setting for receiving data with the receive signal based on the characterized signal quality parameters.

25 Claims, 9 Drawing Sheets

---

A receiver characterizing signal quality parameters of receive signals for a plurality of receive diversity settings

510

The receiver selecting a first receive diversity setting for synchronizing the receiver with the receive signal based on the characterized signal quality parameters

520

The receiver selecting a second receive diversity setting for receiving data with the receive signal based on the characterized signal quality parameters

530

A receiver characterizing receive signal interference, receive signal noise and receive signal dispersion for a plurality of receive diversity settings

710

The receiver selecting a first receive diversity setting for synchronizing with the receive signal

720

The receiver selecting a second receive diversity setting for receiving data with the receive signal

RECEIVING WIRELESS SIGNALS WITH MULTIPLE DIVERSITY SETTINGS

FIELD OF THE DESCRIBED EMBODIMENTS

The described embodiments relate generally to wireless communications. More particularly, the described embodiments relate to a method and apparatus for receiving wireless signals with multiple diversity settings.

BACKGROUND

Accurate packet synchronization is a prerequisite to establishing reliable communication over wireless links. A common approach to achieve synchronization involves the transmitting of a synchronization sequence, also referred to as a preamble, prior to the transmission of the payload. The synchronization sequence has special properties that improve the receiver's ability to combat the effects of channel dispersion, noise and interference.

One form of wireless communication is wireless communication according to the ultra-wide band (UWB) protocol. The Federal Communications Committee (FCC) has mandated that UWB radio transmission can legally operate in the frequency range of 3.1 GHz to 10.6 GHz. The transmit power requirement for UWB communications is that the maximum average transmit Effective Isotropic Radiated Power (EIRP) is −41.25 dBm/MHz in any transmit direction. The result of the low transmission signal power and wide bandwidth can cause UWB signals to have low signal to interference and noise ratios (SINR). Additionally, UWB signals can suffer from high signal dispersion especially in indoor environments where there is considerable scatter energy.

FIG. 1 shows an exemplary UWB network 100 that includes devices 110, 120, 130, 140. The UWB devices are typically deployed indoors and proximate to other UWB devices. Therefore, the UWB devices are prone to interference from other UWB devices. The interference in combination with low SINR and high signal dispersion can make both synchronization and reception of UWB signals difficult.

It is desirable to have an apparatus and method of improving both synchronization and data reception of UWB signals.

SUMMARY

An embodiment includes a method of receiving wireless signals. The method includes a receiver characterizing signal quality parameters of receive signals for a plurality of receive diversity settings. The receiver selects a first receive diversity setting for synchronizing the receiver with the receive signal based on the characterized signal quality parameters. The receiver selects a second receive diversity setting for receiving data with the receive signal based on the characterized signal quality parameters.

Another embodiment includes a method of communicating wireless signals. The method includes characterizing signal quality parameters of wireless signals for a plurality of communication diversity settings. A first receive diversity setting is selected for synchronizing a receiver with the wireless signals based on the characterized signal quality parameters. A second receive diversity setting is selected for the receiver receiving data with the wireless signals based on the characterized signal quality parameters.

Another embodiment includes a method of receiving wireless signals. The method includes a receiver characterizing receive signal interference, receive signal noise and receive signal dispersion for a plurality of receive diversity settings. The receiver selects a first receive diversity setting for synchronizing with the receive signal. The receiver selects a second receive diversity setting for receiving data with the receive signal.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 7 is a flow chart that shows steps of another example of a method of receiving wireless signals.

DETAILED DESCRIPTION

The embodiments described include methods of selecting diversity settings of a transmitter or a receiver from an available set of multiple antenna diversity settings. A first diversity setting can be selected for synchronization and a second diversity setting can be selected for receiving payload data. Various transmission signal parameters can be used in selecting the first and second diversity settings.

Communication diversity can be implemented using transmit and/or receive antenna diversity. The terms communication diversity and antenna diversity may be used interchangeably in the follow discussion. However, it is to be understood that communication diversity can also include other forms of diversity. Antenna diversity can be used to minimize the effects of multi-path and interference. A receiver that includes two receiver antennas can receive, for example, signals S1, S2 wherein the two signals S1, S2 have travel different transmission paths, and therefore, each of the received signals S1, S2 is typically subjected to different degrees of multi-path and interference. The receiver can select one of the signals S1, S2 for reception. Essentially, base-band processing includes selecting each antenna individually based upon various signal quality parameters such as signal power and/or channel response measurements. Typically, the antenna providing the most desirable signal power and channel response is selected. However, the selection can also be based upon a combination of several received signal parameters, such as, signal power, channel delay spread and channel frequency selectivity.

Figure 1:
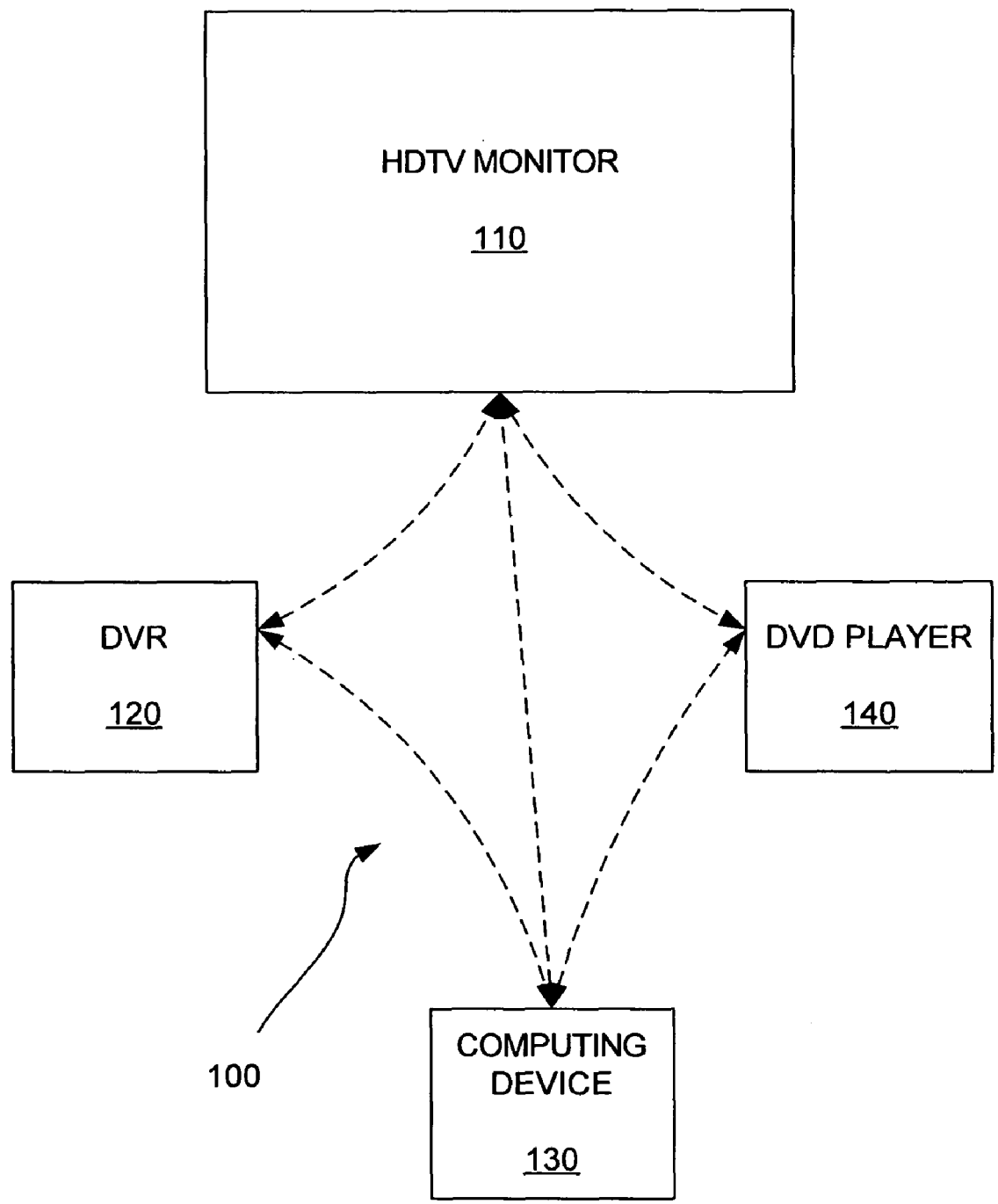
FIG. 1 shows an example of a UWB network.
Figure 2A:
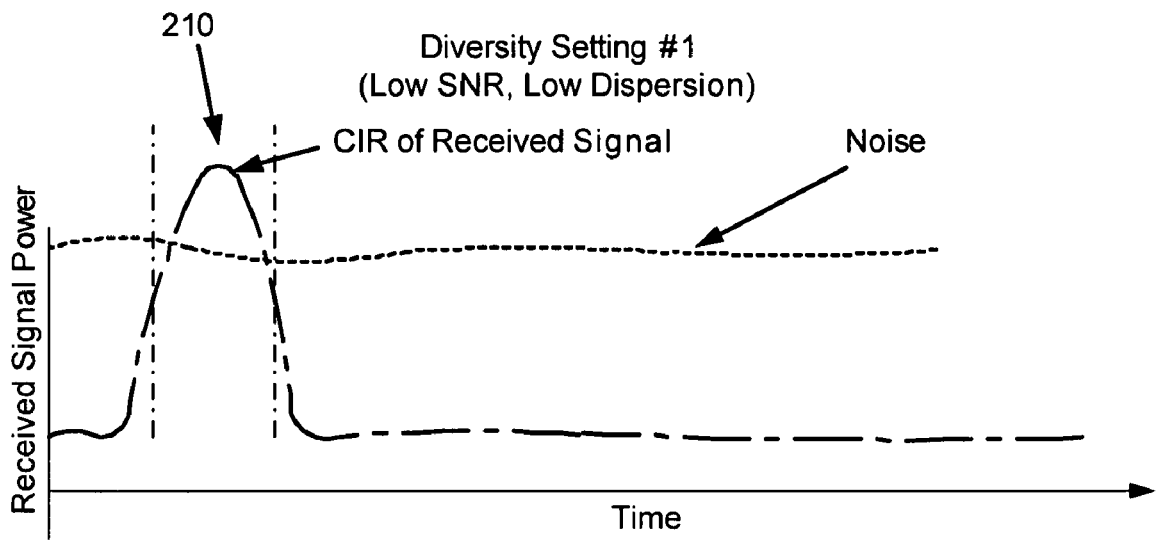
FIG. 2A shows an example of a channel impulse response of a receive signal that has relatively low dispersion.

FIG. 2A shows an example of a channel impulse response (CIR) of a receive signal that has relatively low dispersion. As shown, the receive signal is primarily focused within a narrow period of time 210. As such, the receive signal is not spread in time—that is, the receive signal depicts a relatively small amount of delay spread. The lower the delay spread of a receive signal, generally, the easier it is for a receiver to synchronize with the receive signal. For low delay spreads, the correlation of the received signal with the preamble synchronization sequence results in a stronger peak (relative to the receive signal power) compared to large delay spreads where the channel response may obscure the correlation peaks resulting in packets not being detected.

A receiver (and/or transmitter) that has multiple antennas can be manipulated through the use of antenna diversity to potentially improve (decrease) the delay spread of a receive signal. That is, antennas can be selected for use during transmission of wireless signals so that the transmitted signals suffer from the least amount of delay spread. The antenna selection for least (or at least reduced) delay spread provides for receive signals that typically can be synchronized to more easily than receive signals having higher delay spread.

The receive signal of FIG. 2A may have a relatively low signal to noise ratio (SNR). However, the SNR may not be as critical a signal quality parameter as the delay spread for synchronization. Therefore, the receive signal of FIG. 2A may be desirable for synchronization, but undesirable for data reception.

Figure 2B:
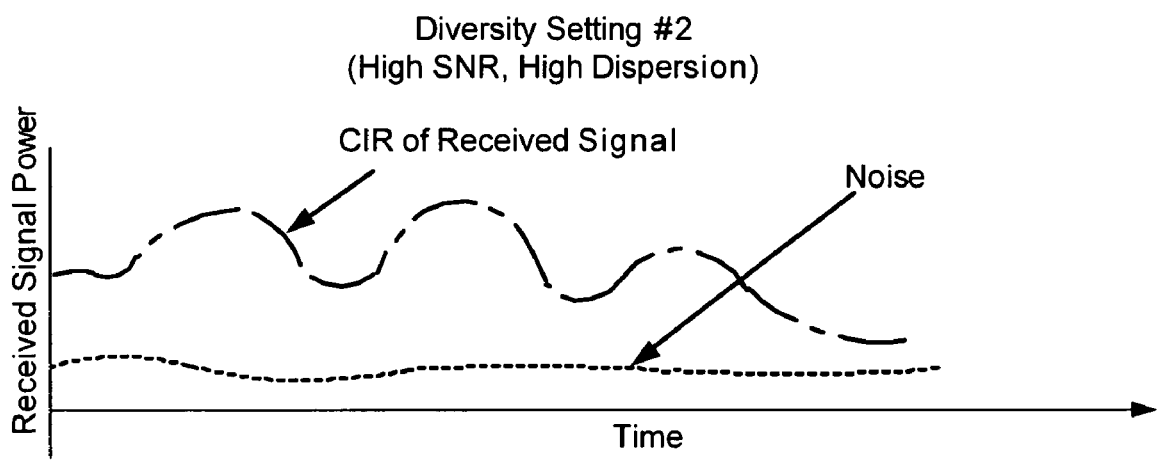
FIG. 2B shows an example of a channel impulse response of a receive signal that has relatively signal to noise ratio (SNR).

FIG. 2B shows an example of a channel impulse response of a receive signal that has a relatively high signal to noise ratio (SNR). While the receive signal of FIG. 2B may have a relatively high delay spread, the SNR (or SINR) typically has a greater impact on the decoding of transmitted data. Therefore, the receive signal of FIG. 2B may be undesirable for synchronization, but be reasonable for data reception.

A receiver (and/or transmitter) that has multiple antennas can be manipulated through the choice of diversity settings (antenna selection settings) to potentially improve (increase) the SNR (or SINR) of a receive signal. That is, antennas or antenna diversity settings can be selected for use during transmission of wireless signals so that the transmitted signals provide a maximum SNR. The diversity setting selection that provides the best (or at least increased) SNR can typically support higher data rate wireless transmission than receive signals corresponding to other diversity settings having lower SNRs.

Figure 3:
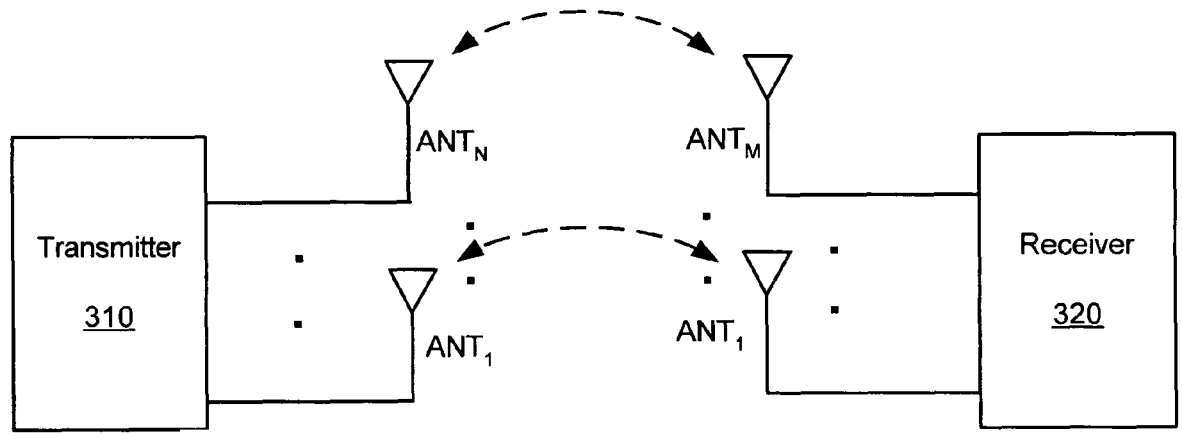
FIG. 3 shows an example of a pair of wireless devices that include multiple antennas allowing for transmit and receive diversity of wireless signals.

FIG. 3 shows an example of a pair of wireless devices 310, 320 that include multiple antennas allowing for transmit and receive diversity of wireless signals. The receiver 320 can cycle through its M antennas and select different possible antennas and/or phase combining settings of multiple antennas for reception of the wireless signals. The receiver can measure and monitor signal quality parameters of wireless signals received with each of the different combinations of receive antennas. Based on the signal quality parameters, the receiver 320 can select one of the multiple diversity settings while attempting to synchronize with received wireless signals, and the receiver 320 can select another diversity setting while receiving data (payload) with the received wireless signals.

It should be understood that the transmitter 310 can additionally or alternatively cycle through its N antennas as well. The antennas selected for diversity communication (for either synchronization and/or data reception) can be made at the receiver 320. Alternatively or additionally, the antennas selection can be made by the transmitter. For example, the transmitter 310 can receive wireless signals from the receiver. Furthermore, the transmitter 310 can assume reciprocity in the wireless channel and select the diversity communication antennas itself.

Figure 4:
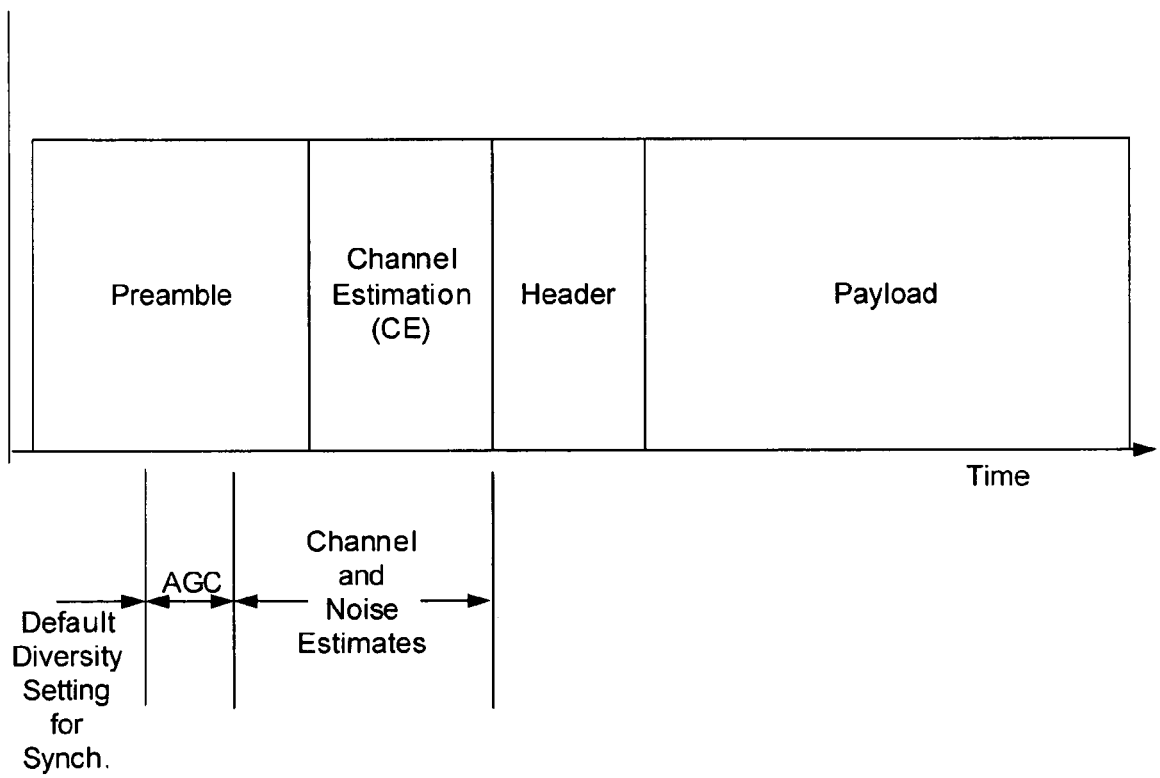
FIG. 4 shows an example of a packet of received wireless signals.

FIG. 4 shows an example of a packet of received wireless signals. As shown, the packet includes a preamble, a channel estimation portion, a header, and payload. A receiver can perform synchronization and adjust an amplitude gain control (AGC) during the preamble. The receiver can perform channel estimation during the channel estimation portion. The receiver can decode the header to determine information about the packet such as data rate and packet length of the payload, intended target device, etc. The receiver can receive payload data during the payload portion.

The previously described signal quality characterizations and measurements can be performed by the receiver during the preamble and/or during the channel estimation portions of the received packets. The diversity communication antenna selections can be made during the same packet, or during later packets.

Figure 5:
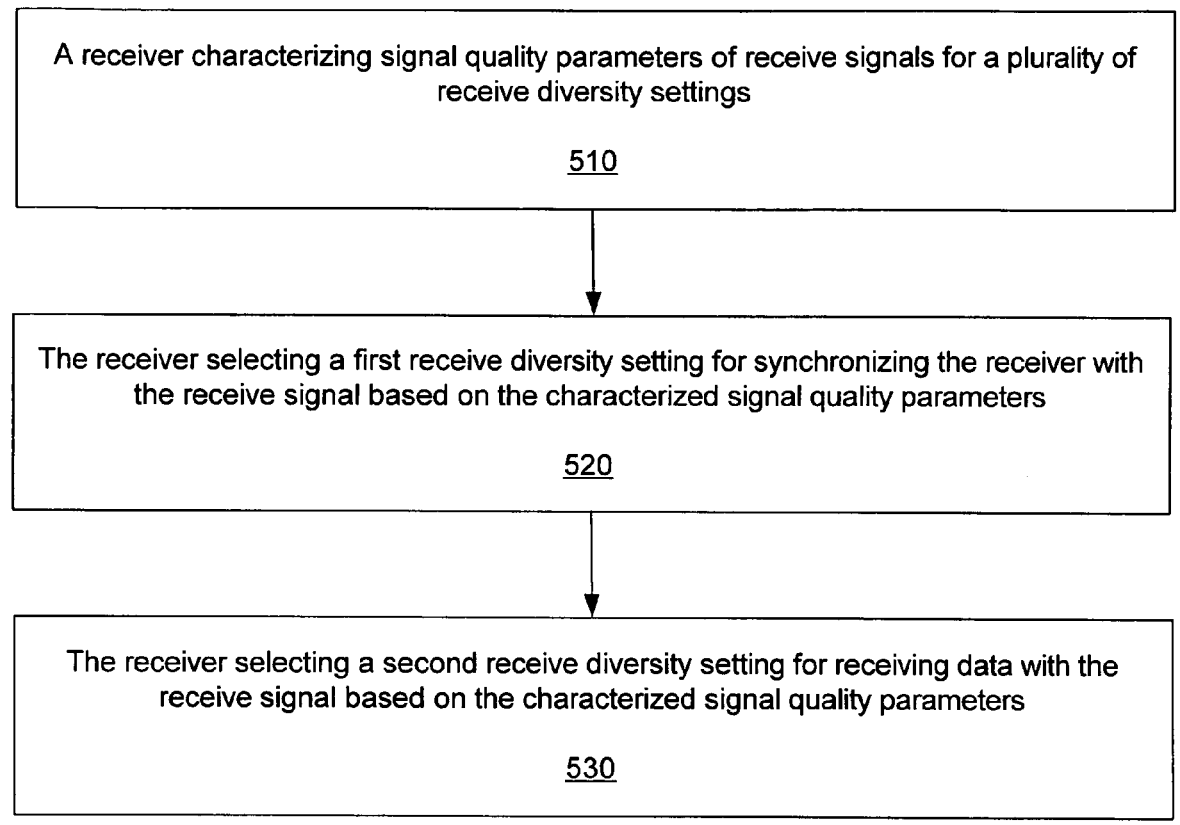
FIG. 5 is a flow chart that shows steps of an example of a method of receiving wireless signals.

FIG. 5 is a flow chart that shows steps of an example of a method of receiving wireless signals. A first step 510 of the method includes a receiver characterizing signal quality parameters of receive signals for a plurality of receive diversity settings. A second step 520 includes the receiver selecting a first receive diversity setting for synchronizing the receiver with the receive signal based on the characterized signal quality parameters. A third step 530 includes the receiver selecting a second receive diversity setting for receiving data with the receive signal based on the characterized signal quality parameters.

The receiver can measure/characterize several different signal quality parameters. Each of the different signal quality parameters can be used for diversity antenna selection depending on whether the receiver is synchronizing with the receive signals or decoding data from the receive signals. A first set of exemplary signal quality parameters include a receive signal SNR, receive signal SINR, predicted PER, receive signal CIR, and interfering signal channel impulse response. This first set can be used to select the diversity antenna selection for reception of data. A second set of exemplary signal quality parameters include receive signal dispersion, and interfering signal dispersion. This second set can be used to select the diversity antenna selection for synchronization.

The receive diversity settings can include diversity settings of the previously described communication diversity. One embodiment of communication diversity includes antenna diversity in which different diversity settings include the selection of a particular selection of antennas for transmission and/or reception of the wireless communication signal. A specific embodiment of antenna diversity include receive diversity in which each diversity setting includes the selection of particular sets of antennas for reception of the wireless communication signal.

As previously described, data reception is typically better the greater the SNR, SIR or SINR of the received signals. Therefore, an embodiment includes at least one of SNR and SIR of the receive signals being greater for the second receive diversity setting than for the first receive diversity setting.

Also, as previously described, synchronization of the receiver to the receive signals is generally easier with lower signal dispersion. Therefore, an embodiment includes the receive signal dispersion of the receive signals being less for the first receive diversity setting than for the second receive diversity setting.

As previously described, the receive signal can include packets. The packets can include several different portions, including a training portion, a preamble portion and/or a channel estimation portion. An embodiment includes the receiver characterizing the signal quality parameters of the received signals for a plurality of receiver diversity settings during training portions of the received signals. The training portions of the received signals can include preamble portions and channel estimation portions.

The signal quality parameters are measured during at least one of several portions of the packets. Embodiments include selecting receiver antennas (and additionally or alternatively transmitter antennas) for reception of receive signals, and for synchronization of receive signals. Embodiment includes characterizing/measuring the signal quality parameters during one packet, and then selecting the receiver antennas during a different packet. Alternatively, the second diversity setting can be determined using the preamble and/or channel estimation portions of the current packet and applied during the same packet.

An embodiment includes the receiver characterizing signal quality parameters of receive signals of one receive diversity setting per packet. That is, the signal quality parameter(s) of one diversity are measured/characterized for each packet, and can vary (that is, different diversity settings) for subsequent packets. Therefore, it may take several packets of receive signals to characterize/measure the signal qualities of all of the multiple diversity settings. Another embodiment includes the receiver characterizing signal quality parameters of receive signals of multiple receive diversity settings per packet. It can be advantageous to perform the signal quality characterizations for all of the diversity settings in a single, or at least minimal number of packets because of the greater likelihood that the characterizations are current and accurate. However, spreading the characterizations over multiple packets may be more desirable if the wireless channel is stationary relative to the time scale of multiple packets and characterization over many packets improves the accuracy of the signal quality parameters being estimated to select the diversity setting.

An embodiment includes the receiver characterizing signal quality parameters of receive signals of at least receive diversity setting during one packet of the received signals, and selecting the first diversity setting during subsequent packets of the receive signals. That is, the diversity setting is characterized during one packet, and the receiver selection the diversity setting and synchronizing with the received signal during another packet.

An embodiment includes the receiver characterizing signal quality parameters of receive signals of at least one receive diversity setting during one packet of the received signals, and also selecting the diversity settings during the one packet of the receive signals. More specifically, the receiver characterizes and selects the diversity setting for receiving data, and receives data with the selected diversity setting during the same packet.

An embodiment includes the receiver characterizing signal quality parameters of receive signals for a plurality of receive diversity settings while the receiver adjusts a relative phase between receive signals of different receive antennas for at least a portion of the receive diversity settings. That is, the phase between signals received through different receive antennas is adjusted, providing additional diversity settings.

For a specific embodiment, the first receive diversity setting includes a one of the plurality of receive diversity settings that has a lowest signal dispersion, and the second receive diversity setting includes a one of the plurality of receive diversity settings that has at least one of the greatest SNR or SINR, or lowest predicted PER.

An embodiment includes the first receive diversity setting including a one of the plurality of receive diversity settings that has a maximum signal dispersion of at least one known interfering signal. That is, synchronization can be impeded by interfering signals. An interfering signal that suffers from low dispersion can have a greater tendency to impede the synchronization of the desired receive signal. Therefore, a selected diversity setting provides that provides a relatively greater signal dispersion of the interfering signal than the other diversity setting can improve the synchronization with the desired receive signal.

Embodiments include averaging the measured/characterized signal quality parameters. For example, an embodiment includes the receiver averaging the signal quality parameters over a plurality of received packets. Averaging can be useful in providing more accurate measurements. SNR, SINR, dispersion of SOI, and dispersion of interferer measurements are more accurate when averaged over many packets thereby suppressing the noise in these measurements.

The receive signals can be frequency hopping signals. The frequency hopping signals "hop" between, for example, different frequency bands. One band can provide better signal quality parameters for synchronization than other band. Of course the diversity settings can influence the signal qualities of each of the bands. For an embodiment, the receive signals include frequency hopping signals that hop among N frequency hopping bands. For this embodiment, synchronization to the receive signals includes characterizing receive signal quality for a plurality of receive diversity settings for each of the N frequency hopping bands, and initiating synchronization of the received signals during a one of the frequency hopping bands based on the characterized receive signal quality of each of the N frequency hopping bands for each of the plurality of receive diversity settings.

The receiver selection of the first receive diversity setting (for synchronization) can be additionally influenced by other signal parameters. For example, one embodiment further includes the receiver selecting the first receive diversity setting for synchronizing the receiver with the receive signal based on determining a percentage of receive signal packets that are not properly synchronized. Various methods can be used to determine whether packets are properly synchronized. For one embodiment, determining whether receive signal packets are not properly synchronized includes detecting packet header decoding errors. For another embodiment, determining whether receive signal packets are not properly synchronized includes determining that scheduled packets are not received. For another embodiment, determining whether receive signal packets are not properly synchronized includes determining a number of false synchronizations to an interfering signal. The interfering signal can be a like signal (that is, a common network signal such as another UWB signal) that the receiver falsely synchronizes to as opposed to synchronizing to a signal of interest.

Figure 6:
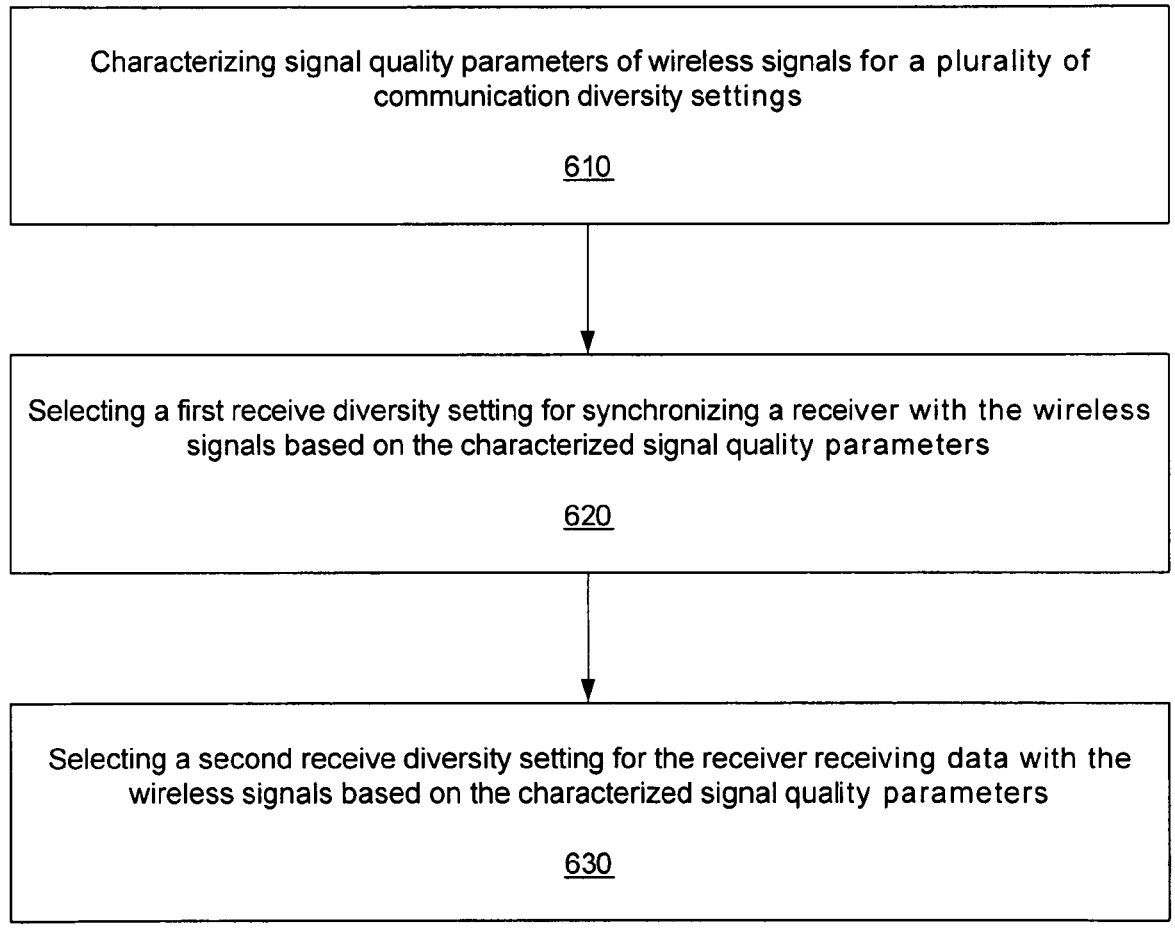
FIG. 6 is a flow chart that shows steps of an example of a method of communicating wireless signals.

FIG. 6 is a flow chart that shows steps of an example of a method of communicating wireless signals. A first step 610 of the method includes characterizing signal quality parameters of wireless signals for a plurality of communication diversity settings. A second step 620 includes selecting a first receive diversity setting for synchronizing a receiver with the wireless signals based on the characterized signal quality parameters. A third step 630 includes selecting a second receive diversity setting for the receiver receiving data with the wireless signals based on the characterized signal quality parameters.

An embodiment includes at least one of a transmitter and the receiver characterizing the signal quality parameters. That is, embodiments include the transmitter and/or the receiver performing the signal quality characterizations. Additionally, an embodiment includes at least one of the transmitter and the receiver selecting the first communication diversity setting. That is, the first communication diversity setting can be selected by either the transmitter and/or the receiver. Additionally, an embodiment includes at least one of the transmitter and the receiver selecting the second communication diversity setting. That is, the second communication diversity setting can be selected by either the transmitter and/or the receiver.

In some situations it can be advantageous for the selections of the diversity settings to be jointly made. That is, an embodiment includes the first communication diversity setting and the second communication diversity setting being jointly selected by the transmitter and the receiver. For instance, if there is significant interference present in the received signal and the channel dispersion of the SOI is high, the receiver may not have sufficient degrees of freedom with provided diversity settings to minimize the dispersion of the SOI and simultaneously maximize the dispersion of the interferer. However, by coordinating with the transmitter, the receiver can select a first diversity setting to maximize the dispersion of the interferer and the transmitter can select a first diversity setting to minimize the dispersion of the signal of interest. An embodiment of this described example includes the transmitter and the receiver having multiple antennas.

It is to be understood that the diversity settings can be selected at the receiver, the transmitter, or at both the receiver and the transmitter. For example, if the receiver includes a single antenna, the transmitter can select a diversity setting by selecting one of multiple transmit antennas. The desired diversity setting can be determined at the receiver and fed back to the transmitter, or the transmitter can make the selection itself. One embodiment includes the transmitter characterizes the signal quality parameters by receiving wireless signals from the receiver and assuming transmission channel reciprocity. This embodiment can additionally include at least one of the first receive diversity setting and the second receive diversity setting being selected by the transmitter.

FIG. 7 is a flow chart that shows steps of another example of a method of receiving wireless signals. A first step 710 of the method includes a receiver characterizing receive signal interference, receive signal noise and receive signal dispersion for a plurality of receive diversity settings. A second step 720 include the receiver selecting a first receive diversity setting for synchronizing with the receive signal. A third step 730 includes the receiver selecting a second receive diversity setting for receiving data with the receive signal.

Figure 8:
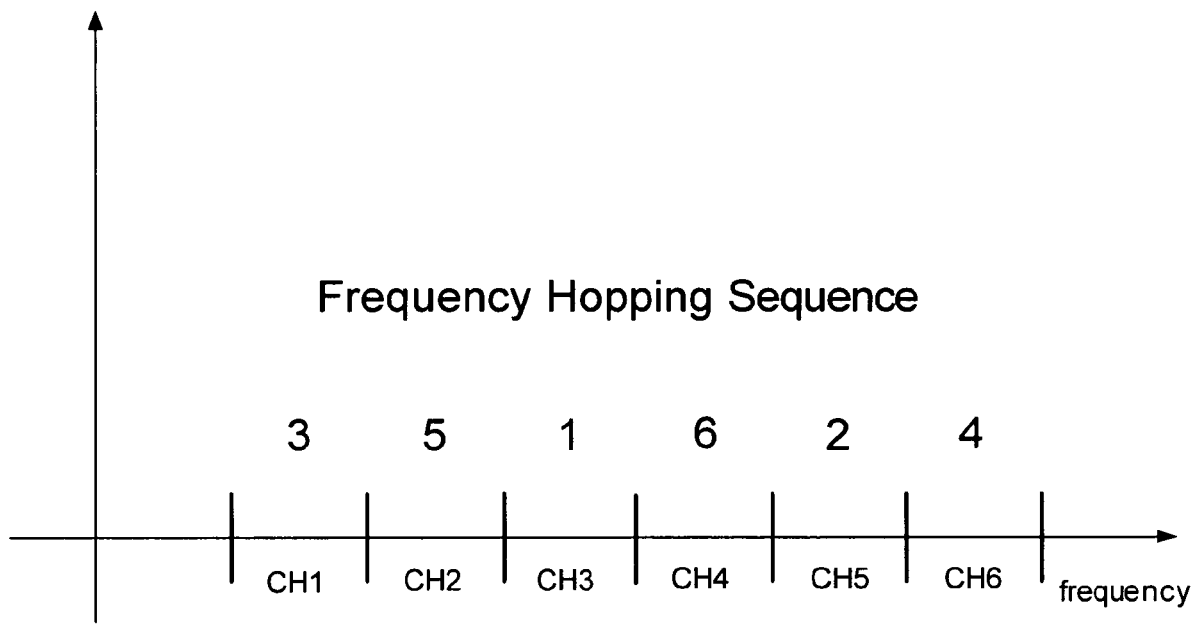
FIG. 8 is a time-line showing a frequency hopping signal.

FIG. 8 shows a frequency spectrum of communication frequency bands (hereafter referred to, interchangeably, as frequency hopping bands or frequency bands), and an example of a sequence of frequency bands for transmission of data symbols. As shown, this example includes six communicating frequency bands (labeled CH1 through CH6) that are defined by a frequency hopping sequence. Frequency-hopping is a method of transmitting radio signals by switching a carrier among many frequency bands, using a deterministic or pseudorandom sequence known to both transmitter and receiver. In this example, symbols of the signal are transmitted such that the energy of the first symbol occupies frequency band 3, the next symbol's energy occupies frequency band 5 and so forth. After the sixth symbol, which occupies frequency band 4, the pattern may repeat or it may be followed with a continuation of a pseudorandom sequence.

For an embodiment, synchronization is initially established by a receiver monitoring a single one of the frequency hopping bands. The diversity communication antenna selections can be made for each band, and the single band selected. If a signal of interest is detected, a synchronization sequence can be initiated to establish synchronization of the receiver to the signal of interest. However, randomly selecting the band for monitoring reception of the signal of interest may not provide optimal synchronization. That is, for example, if the third band (B3) is selected as the band to be monitored for the signal of interest, the interferer 130 may reduce the receiver's ability to detect the signal of interest. If the second band (B2) suffers from less noise and interference, then the second band (B2) is probably a better band to monitor for the signal of interest.

For UWB signals, the receive signal may comprise packets that include a synchronization signal followed by header and payload signals. A designated synchronization band (for example, the band suffering from the least amount of interference and noise) can be monitored. Upon detection of a synchronization signal within the designated synchronization band, the receiver can initiate hopping to other frequency bands as determined by timing information obtained during the synchronization process and the predetermined frequency hopping sequence of the detected signal of interest.

The synchronization detection can be spread over several frequency hopping bands to provide more robust and accurate synchronization. Interfering signals typically vary in their levels of interference between different bands.

The first step of synchronization involves the receiver continually running a correlation with the received signal based on a known synchronization sequence. For example, the known sequence can include OFDM symbol data know a priori by both the transmitter and the receiver. The receiver transmits synchronization signals according to the a priori OFDM symbol sequence which can be detected by the receiver to establish synchronization. Based on the output of the correlation, the receiver can declare synchronization. That is, for example, if the correlation output includes signal peaks greater than a predetermined threshold, synchronization is declared. In order to ensure that the detection is not dependent on the signal power, the correlation peaks can be normalized by the signal power and then compared with a predetermined threshold.

Following the initial detection based on the threshold test, the synchronization procedure continues by performing the correlation of the received signal on an ordered sequence of synchronization bands in which the synchronization bands are a subset of the frequency hopping bands. Embodiments of selecting the ordered sequence are dependent on the received signal quality of each of the frequency hopping bands, the sequence of the frequency hopping bands, and/or processing latency of the correlation circuitry.

Once the signal of interest has been detected, the synchronization process is initiated. As described, an embodiment includes establishing synchronization in the initial band (the initial band being selected based on the signal quality of each of the frequency hopping bands), and then establishing synchronization in the ordered sequence. The synchronization processing, for example, correlating the received signal of interest with a known synchronization sequence, takes processing time. This latency can influence the ordered sequence. That is, the frequency hopping sequence may suggest establishing synchronization in the band that comes after the initial band, but the synchronization processing time may require the receiver to establish synchronization in a later band, thereby influencing the ordered sequence of synchronization establishment. This latency can be used, for example, to strategically place a poor signal quality frequency hopping to be missed by the ordered sequence.

Improvements in receiver synchronization performance through the use of diversity selection for synchronization can vary depending on the wireless channel environment of the wireless transmitter and the wireless receiver. The improvements realized by including diversity selection for synchronization is typically greater for highly dispersive non-line of sight channels (common, for example, in indoor wireless networking systems), when the receiver antenna spacing is selected to minimize the correlation among the channels of the multiple receive antennas. If responses of the channels are highly uncorrelated, there is a higher probability that a selection or combination of channel responses will yield an effective channel that is less dispersive.

Figure 9:
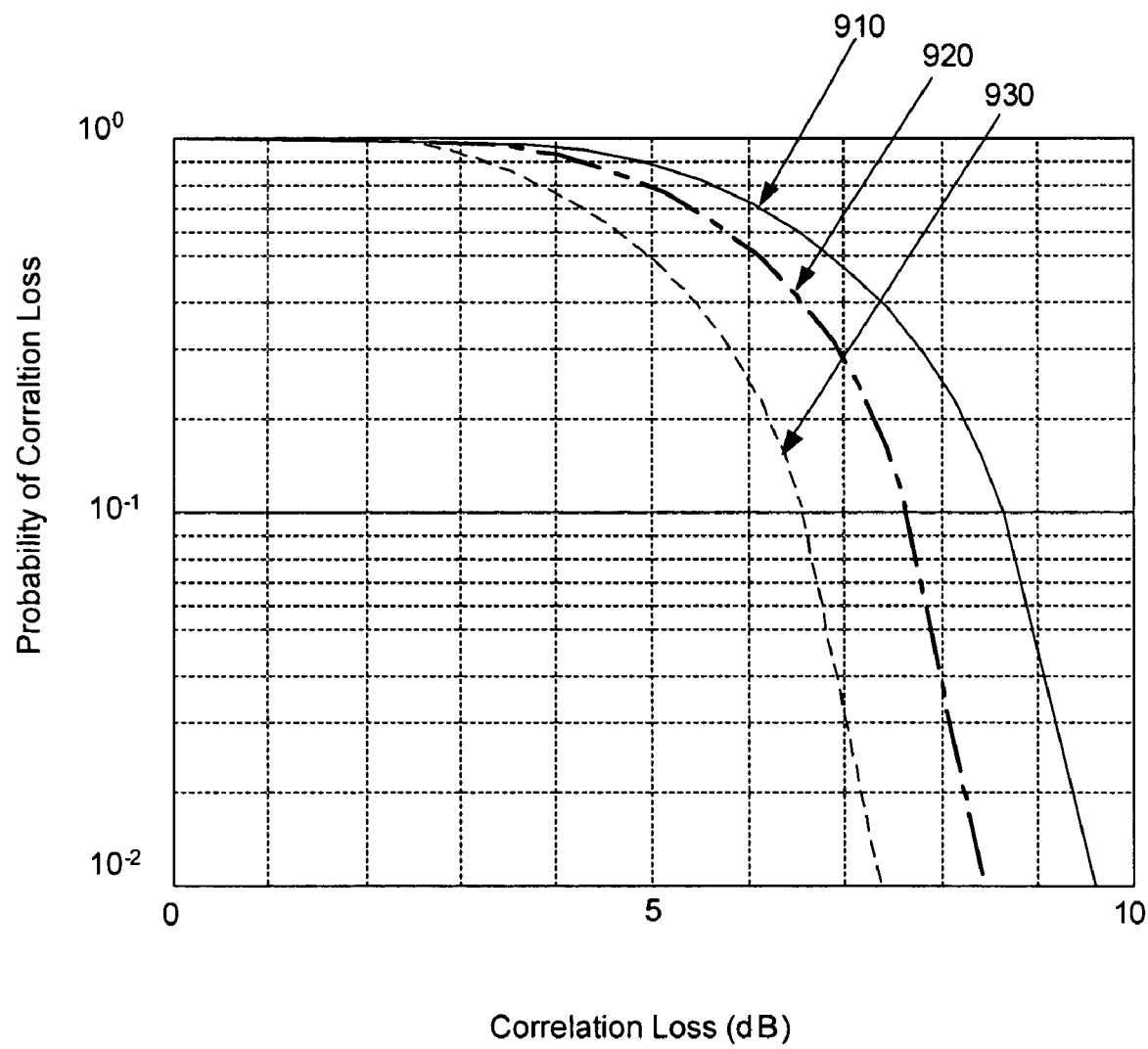
FIG. 9 is a plot of signal quality of received signals for various configurations of communication diversity settings.

FIG. 9 is a plot of signal quality of received signals for various configurations of communication diversity settings. The first curve 910 shows simulation results for a receiver having no diversity. The second curve 920 shows simulation results for a receiver having two receive antennas, and selecting the receiver diversity setting that optimizes channel dispersion. That is, the diversity setting that corresponds with a channel response having the minimum correlation loss is chosen. The third curve 930 shows simulation results for the receiver having two receive antennas, and selecting the receiver diversity setting that results in the highest receiver SNR.

As depicted by the curves 910, 920, 930, the best performing configuration of curve 920 provides approximately 2 dB of gain over the no diversity configuration. Depending upon the channel dispersion and the specific synchronization diversity selection methodology used, the difference can be greater.

The x-axis represents the correlation loss with respect to an ideal channel (i.e. single tap channel impulse response). In other words, when the received signal is correlated with the synchronization sequence, the maximum correlation is observed when the channel is an ideal single tap channel. The correlation loss is measure of the degradation for the measured channel response with respect to this maximum correlation. The y-axis represents the probability that the correlation loss is greater than the abscissa over a collection of wireless channel realizations based on an indoor channel model.

Although specific embodiments have been described and illustrated, the embodiments are not to be limited to the specific forms or arrangements of parts so described and illustrated.

What is claimed:

1. A method of receiving wireless signals, comprising:
   a receiver characterizing signal quality parameters of receive signals for a plurality of receive diversity settings;
   the receiver selecting a first receive diversity setting for synchronizing the receiver with the receive signal based on the characterized signal quality parameters;
   the receiver selecting a second receive diversity setting for receiving data with the receive signal based on the characterized signal quality parameters.

2. The method of claim 1, wherein the signal quality parameters comprises at least one of a receive signal SNR, receive signal SINR, predicted PER, receive signal CIR, and interfering signal channel impulse response.

3. The method of claim 1, wherein the signal quality parameters comprises at least one of a receive signal dispersion, and an interfering signal dispersion.

4. The method of claim 2, wherein at least one of SNR and SIR of the receive signals is greater for the second receive diversity setting than for the first receive diversity setting.

5. The method of claim 3, wherein receive signal dispersion of the receive signals is less for the first receive diversity setting than for the second receive diversity setting.

6. The method of claim 1, further comprising the receiver characterizing the signal quality parameters of the received signals for a plurality of receiver diversity settings during preamble portions of the received signals.

7. The method of claim 1, wherein the receive signals comprise packets, and the receiver characterizes signal quality parameters of receive signals of one receive diversity setting per packet.

8. The method of claim 1, wherein the receive signals comprise packets, and the receiver characterizes signal quality parameters of receive signals of multiple receive diversity settings per packet.

9. The method of claim 1, wherein the receiver characterizes signal quality parameters of receive signals of at least receive diversity setting during one packet of the received signals, and selects the first diversity setting during subsequent packets of the receive signals.

10. The method of claim 1, wherein the receiver characterizes signal quality parameters of receive signals of at least receive diversity setting during one packet of the received signals, and selects the second diversity setting during the one packet of the receive signals.

11. The method of claim 1, wherein receiver characterizing signal quality parameters of receive signals for a plurality of receive diversity settings comprises the receiver adjusting a relative phase between receive signals of different receive antennas for at least a portion of the receive diversity settings.

12. The method of claim 1, wherein the first receive diversity setting comprises a one of the plurality of receive diversity settings that has a lowest signal dispersion, and wherein the second receive diversity setting comprises a one of the plurality of receive diversity settings that has at least one of the greatest SNR or SINR, or lowest predicted PER.

13. The method of claim 1, wherein the first receive diversity setting comprises a one of the plurality of receive diversity settings that has a maximum signal dispersion of at least one known interfering signal.

14. The method of claim 1, further comprising the receiver averaging the signal quality parameters over a plurality of received packets.

15. The method of claim 1, wherein the receive signals comprising frequency hopping signals that hop between N frequency hopping bands, and wherein synchronization to the receive signals comprises:
   characterizing receive signal quality for a plurality of receive diversity settings for each of the N frequency hopping bands;
   initiating synchronization of the received signals during a one of the frequency hopping bands based on the characterized receive signal quality of each of the N frequency hopping bands for each of the plurality of receive diversity settings.

16. The method of claim 1, further comprising the receiver selecting the first receive diversity setting for synchronizing the receiver with the receive signal based on determining a percentage of receive signal packets that are not properly synchronized.

17. The method of claim 16, wherein determining receive signal packets that are not properly synchronized comprises detecting packet header decoding errors.

18. The method of claim 16, wherein determining receive signal packets that are not properly synchronized comprises determining that scheduled packets are not received.

19. The method of claim 16, wherein determining receive signal packets that are not properly synchronized comprises determining that the receiver is synchronizing to packets of an interfering signal.

20. A method of communicating wireless signals, comprising:
- characterizing signal quality parameters of wireless signals for a plurality of communication diversity settings;
- selecting a first communication diversity setting for synchronizing a receiver with the wireless signals based on the characterized signal quality parameters;
- selecting a second communication diversity setting for the receiver receiving data with the wireless signals based on the characterized signal quality parameters.

21. The method of claim 20, further comprising:
- at least one of a transmitter and the receiver characterizing the signal quality parameters;
- at least one of the transmitter and the receiver selecting the first communication diversity setting;
- at least one of the transmitter and the receiver selecting the second communication diversity setting.

22. The method of claim 21, wherein the at least one of the first communication diversity setting and the second communication diversity setting is jointly selected by the transmitter and the receiver.

23. The method of claim 20, wherein a transmitter characterizes the signal quality parameters by receiving wireless signals from the receiver and assuming transmission channel reciprocity.

24. The method of claim 20, wherein at least one of the first receive diversity setting and the second receive diversity setting is selected by the transmitter.

25. A method of receiving wireless signals, comprising:
- a receiver characterizing receive signal interference, receive signal noise and receive signal dispersion for a plurality of receive diversity settings;
- the receiver selecting a first receive diversity setting for synchronizing with the receive signal;
- the receiver selecting a second receive diversity setting for receiving data with the receive signal.

* * * * *